United States Patent [19]

Wind

[11] Patent Number: 4,949,175
[45] Date of Patent: Aug. 14, 1990

[54] DIGITAL DATA TRANSMISSION SYSTEM
[75] Inventor: Anthony G. Wind, Rochester, N.Y.
[73] Assignee: Eastman Kodak Company, Rochester, N.Y.
[21] Appl. No.: 381,904
[22] Filed: Jul. 19, 1989
[51] Int. Cl.$^5$ .............................................. H04N 1/00
[52] U.S. Cl. ................................... 358/141; 358/442; 358/444; 358/903; 364/413.13; 364/413.22
[58] Field of Search ............... 358/141, 442, 444, 445, 358/903; 364/413.13, 413.22

[56] References Cited

U.S. PATENT DOCUMENTS

| | | | |
|---|---|---|---|
| 4,148,070 | 4/1979 | Taylor | 358/141 |
| 4,751,587 | 6/1988 | Asahina | 358/141 |
| 4,802,008 | 1/1989 | Walling | 358/141 |

Primary Examiner—Howard W. Britton
Attorney, Agent, or Firm—Thomas H. Close

[57] ABSTRACT

An improved system for transmitting and receiving digital images includes means for storing portions of an incoming data packet in memory while the data packet is still being received from the data source, and extract the framing characters from the incoming data stream into separate buffers. This allows the next data packet to be requested very quickly due to the ability to perform the data validation testing immediately upon receiving the last character of the packet. This immediate validation feature allows the remaining data of the packet to be processed into memory concurrently with the reception of a new data packet from the data source. This "semi-concurrent" processing ability of the invention greatly reduces the time required to transfer the image data by reducing the time between the reception of an end-of-line character and the time the logic and control unit can request a new line, and by curtailing the delay between the data request by the invention, and the start of the data packet transmission by the data source.

4 Claims, 7 Drawing Sheets

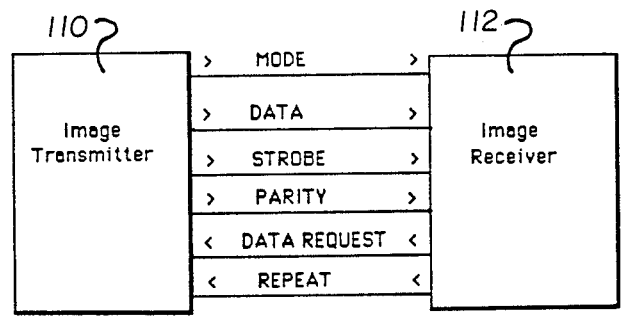
FIG. 1
PRIOR ART
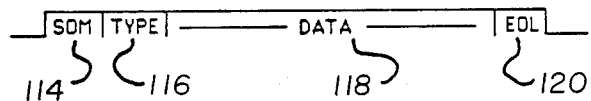
FIG. 2
PRIOR ART
| DATA | MODE BIT | CHARACTER TYPE |
|---|---|---|
| 122 | 124 | 126 |
| 11111111 | 1 | START OF MESSAGE |
| 00000011 | 1 | SIZE/DATA LINE TYPE |
| 00000000 | 0 | IMAGE DATA |
| 11111111 | 0 | IMAGE DATA |
| — | | IMAGE DATA |
| 00000000 | 0 | IMAGE DATA |
| 11111111 | 0 | IMAGE DATA |
| 00000001 | 1 | END OF LINE/IMAGE |
FIG. 3
PRIOR ART

DIGITAL DATA TRANSMISSION SYSTEM

FIELD OF THE INVENTION

The present invention relates to a digital data transmission system, and more particularly to a mechanism for receiving digital images from a diagnostic imaging source.

BACKGROUND OF THE INVENTION

Circuitry and algorithms are known for receiving digital diagnostic images from a diagnostic imaging source where the image is received via an interconnecting cable in a "packet" format comprised of image pixels and framing characters on a line by line basis. In particular is the UBMED protocol that specifies signals, and timing relationships between the signals in a "packet" image transfer network. Designed by Siemens Company, this protocol is employed for example in systems such as the General Electric Advantx DX DSA scanner, the Siemens Somatom Plus CT scanner, Philips Gyroscan T5 and T15 MR scanners, and the Resonex RX4000 MR scanner.

Known systems employed to receive images transmitted according to the UBMED protocol, as represented by the KEDI-M1000 sold by the Eastman Kodak Company, Rochester, NY., operate in a serial, non-concurrent mode, where each data packet of the image is received into a First-in-First-Out (FIFO) memory, processed by a Logic and Control Unit, stored in conventional Random Access Memory (RAM), and then a new packet is requested from the imaging source. This method is inherently slow due to the serial nature of the data processing path, and the need to wait until the entire data packet has been received in the FIFO before local processing can begin. In such a case, the next packet or a repeat of the current packet cannot be requested until the current line has been completely stored in RAM, and all testing for data validation has been completed.

Referring to FIG. 1, an overall view of the system interconnection is shown with the Image Transmitter 110, the Image Receiver 112, and the electrical signals interconnecting these system components. The Image Transmitter 110 can be any image data source equipped with a data transmitter that produces the specified interconnection signals, and transmits the image data on a line by line basis wherein each line consists of framing and data characters as shown in FIG. 2.

Referring to FIG. 2, the data line consists of a start of Message Character 114, a Message Type Character 116, and the Image Data 118, and an end of Line/Image Character 120. The Framing Characters 114, 116, and 120 are differentiated from the image data 118 by the Mode Bit (FIG. 3, 124). Referring to FIG. 3, the Mode Bit 124, when combined with the Data 122, produce the Framing Character Types 126. Referring to FIG. 2, the framing character values may vary from different imaging sources, but the Line Format 114, 116, 118, and 120 remains constant.

The transfer image size is specified in the first line that is transmitted to the receiver by replacing the Data Characters 118, with the image size consisting of a four byte sequence specifying the line size most significant byte, the line size least significant byte, the number of lines most significant byte, and the number of lines least significant byte. Referring to FIG. 4, this information is utilized by a Logic and Control Unit 134 to verify that an image transfer is completed with no missing or extraneous data.

In reference to FIG. 4, an image transfer is initiated by the Logic and Control Unit 134 asserting a DATA REQUEST to the host system. The host system transmitter then responds to the receiver by sending the image size line specifying the image size parameters. The transmitted line is stored in the FIFO 128, and the framing characters are also recorded by the Mode Counter 130. The Mode Counter 130 is loaded with a value of three, and decrements by one each time a Mode Character is received from the host system. Upon recording the third Mode Character, the Mode Counter 130 outputs a EOL signal to the Logic and Control Unit 134, which then negates the DATA REQUEST. Additionally, as each character is received, the parity of the character is checked by the Parity Check Circuit 132, and an error latch is set if the parity does not match the prescribed type.

Upon receiving the EOL signal from the Mode Counter 130, the Logic and Control Unit 134 samples the ERROR signal from the Parity Check Circuit 132. If the ERROR signal is asserted, contents of the FIFO 128 are discarded and the Logic and Control Unit 134 proceeds to order a repeat of the received line by asserting the REPEAT REQUEST signal in conjunction with the DATA REQUEST. This sequence is repeated a predetermined number of times, or until the line is received with no errors.

If the ERROR signal is not asserted, a Mode Evaluator 152 in the Logic and Control Unit 134 proceeds to check the first two characters in the FIFO 128 for proper values, then orders a FIFO (128) reset and a REPEAT REQUEST if the values are not the expected values. If the first two characters are of the expected value, the Logic and Control Unit 134 then initiates a transfer of the data characters in the FIFO 128 to the Image Memory 136 over the System Bus 142, and records the transfer of each character by an increment of the value in a Pixel Done Counter 144 in the Logic and Control Unit 134, which is then compared with the expected line size. The FIFO 128 status is monitored by the Logic and Control Unit 134 by sampling the EMPTY signal produced by the FIFO. Should the FIFO 128 go empty before the Pixel Done Counter 144 in the Logic and Control Unit 134 increments to the line size value that was received in the first "packet" and stored in the Logic and Control 134, an error condition is declared and the Logic and Control Unit 134 will reorder the data line.

When the Pixel Done Counter 144 of the Logic and Control Unit 134 increments to the line size value, the EMPTY signal is sampled to insure that there is still at least one character left in the FIFO 128. Should the EMPTY signal be asserted, the Logic and Control Unit 134 will declare an error condition and reorder the data line if possible, depending on host system timing constraints. If the host system timing constraints do not allow the data "packet" to be reordered, the image transmission is aborted and restarted from the first line. This results in undesirable transmission delays and inefficient use of the data transmission channel. Otherwise, the Logic and Control Unit 134 reads another character from the FIFO 128 and the Mode Evaluator 152 evaluates it for the expected and end-of-line character value. Should the value not be the expected value, an error condition is declared and a reorder of the data line is executed, otherwise the EMPTY signal is checked to insure that no more characters reside in the FIFO 128. Should the EMPTY signal not be asserted, an error condition is declared and a reorder of the data line is executed, otherwise a Line Counter 154 in the Logic and Control Unit 134 increments by one. If the Line Counter 154 in the Logic and Control Unit 134 is equal to the line number value that was received in the first "packet" and stored in the Logic and Control Unit 134, then the image transfer has been completed, otherwise the next data line is requested from the host system, and the process is repeated until the entire image has been received.

It is the object of the present invention to provide an improved digital data transmission system operating according to the UBMED protocol that avoids the shortcomings noted above.

SUMMARY OF THE INVENTION

The shortcomings of the prior art for meeting increased data throughput are overcome by the invention which includes a means for storage of portions of the incoming data packet in memory while the data packet is still being received from the data source, and extracting the framing characters from the incoming data stream into separate buffers. This allows the next data packet to be requested very quickly due to the ability to perform the data validation testing immediately upon receiving the last character of the packet. This immediate validation feature allows the remaining data of the packet to be processed into memory concurrently with the reception of a new data packet from the data source. This "semi-concurrent" processing ability of the invention greatly reduces the time required to transfer the image data by reducing the time between the reception of an end-of-line character and the time the logic and control unit can request a new line, and by curtailing the delay between the data request by the receiver, and the start of the data packet transmission by the data source.

BRIEF DESCRIPTION OF THE DRAWINGS

FIG. 1 is a schematic diagram of a system for transmitting digital image data according to the UBMED protocol;

FIG. 2 is a diagram useful for describing a typical data packet and the relative position of the framing characters to the image data;

FIG. 3 is a table listing the Mode and Data signals that are used to convey the framing and data characters from the host system to the invention, and the binary values of the signals for the type of characters that are conveyed in a typical data packet according to the UBMED protocol;

MODES OF CARRYING OUT THE INVENTION

Figure 4:
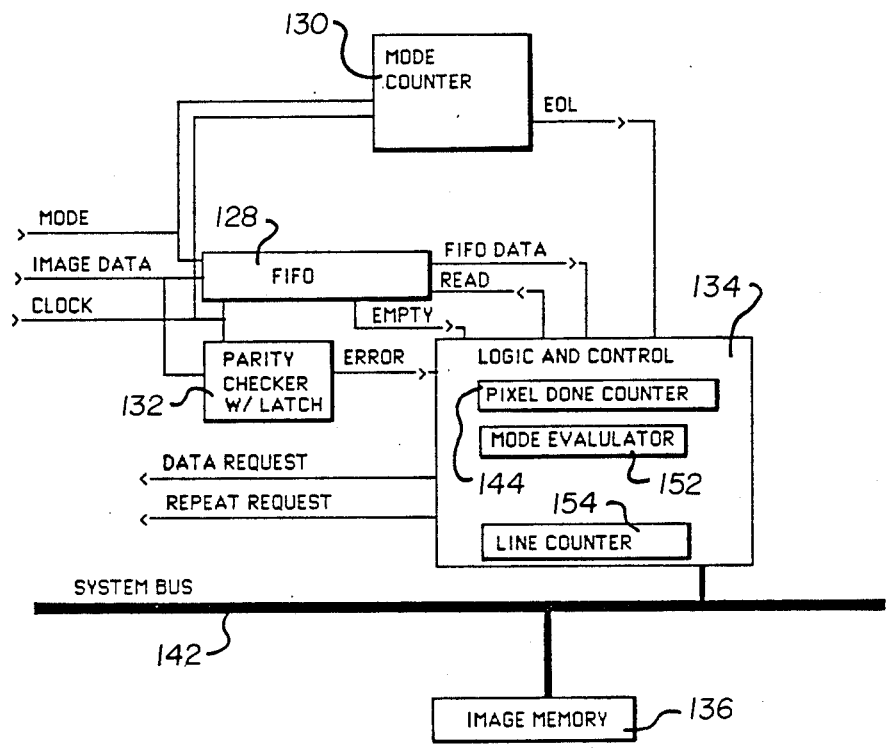
FIG. 4 is a block diagram of a prior art data receiver operating according the UBMED protocol.
Figure 6:
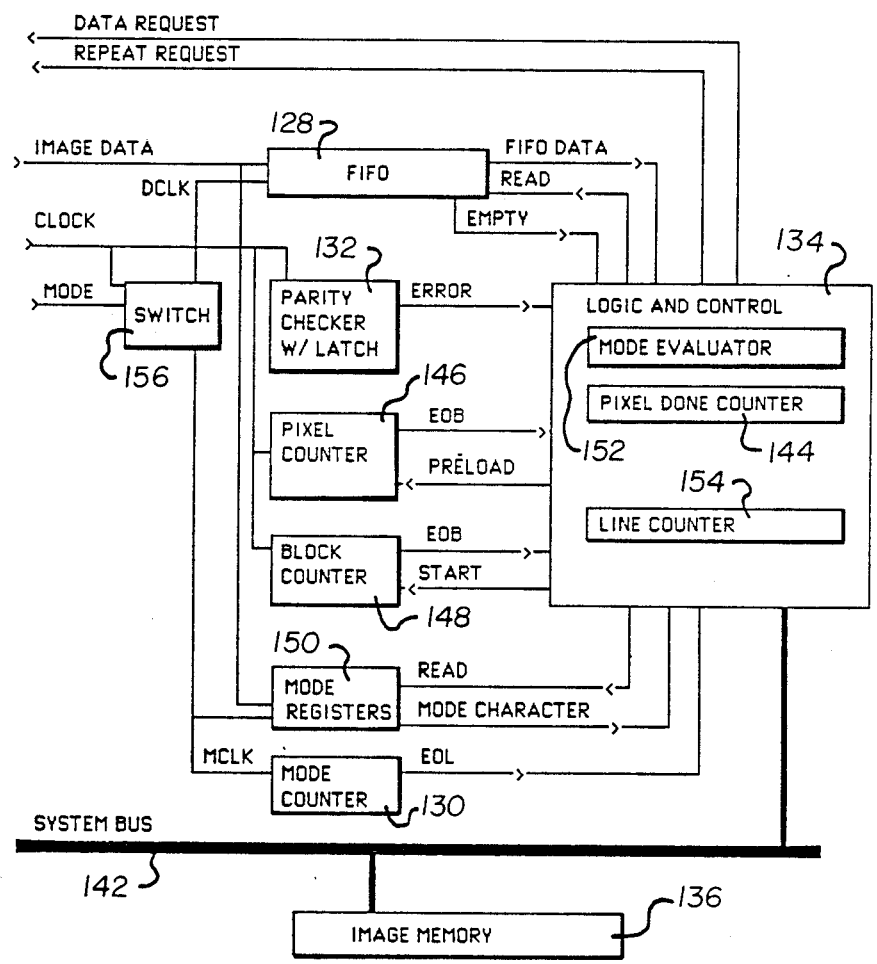
FIG. 6 is a block diagram of the receiver according to the present invention, showing in particular the circuitry external to the Logic and Control Unit.

Referring to FIG. 6 where elements similar to those in FIG. 4 are similarly numbered, the invention adds some additional circuitry to the prior art shown in FIG. 4 to enhance circuit operation and increase data throughput. The FIFO 128 is loaded with the input data characters, and the framing characters are routed to Mode Registers 150 by a Logical Switch 156 that directs the input data clock to the appropriate devices depending on the condition of the Mode Bit. A Pixel Counter 146 counts all incoming data characters, and the Parity Checker 132 performs a parity check on all incoming characters setting the parity error latch if any of the received characters do not conform to the prescribed parity type.

An additional circuit, the Block Counter 148, counts a predetermined number of incoming characters (BLOCKSIZE) when enabled by the Logic and Control Unit 134. The output of the Block Counter 148 (EOB) is sampled by the Logic and Control Unit 134 for an indication that the Block Counter 148 decrements from a predetermined count, to zero. Upon receiving this indication, the Logic and Control Unit 134 transfers a number of pixels equal to the predetermined block count from the FIFO 128 to the Image Memory 136 via the System Bus 142, and increments the Pixel Done Counter 144 in the Logic and Control Unit 134 by one for each pixel transferred. Upon completion of the transfer, the Block Counter 148 is again enabled by the Logic and Control Unit 134 to count another block of pixels. This process is repeated as often as possible during the reception of the data packet from the data source, or until the EOL signal from the Mode Counter 130 indicates to the Logic and Control Unit 134 that the data packet transfer has been completed. The predetermined number of pixels counted by the Block Counter 148 is variable to allow adjustment of the block transfer process for the most efficient operation of the transfer system. In one embodiment. the predetermined number is set by a technician by hardware means in the Block Counter 148. According to another embodiment, an algorithm in the Logic and Control Unit 134 calculates the predetermined number based on the line size of an image, the input data rate, and the transfer to image memory rate, and sets the predetermined number in the Block Counter 148.

Upon detection of the EOL signal, the Logic and Control Unit 134 reads and evaluates the framing characters that were stored in the Mode Registers 150, and samples the output of the Parity Check Circuit 132. The Mode Registers 150 may store all three framing characters. Alternatively, only the end of line character can be stored in the Mode Register and the start of message and line type characters may be retrieved from the FIFO 128.

Should a framing character or parity error occur, the Logic and Control Unit 134 clears the contents of the FIFO 128, reinitializes the pointer to the beginning of the data line in Image Memory 136, and asserts a REPEAT REQUEST to the data source to initiate a repeat of the data line by the data source. Should the framing characters and parity be correct, the Logic and Control Unit 134 then determines the number of pixels remaining in the FIFO 128 by subtracting the value in the Pixel Done Counter 144 from the line size value received in the first packet.

If the allowable number of pixels remaining in the FIFO 128 is less than a predetermined value, the Logic and Control Unit 134 then asserts a new DATA REQUEST for the next line, and commences to move the remaining pixels in the FIFO 128 to Image Memory 136 using the Pixel Done Counter 144 in the Logic and Control Unit 134 to determine the number of transfers to be accomplished. If the number of pixels remaining in the FIFO 128 is greater than the predetermined value, then the Logic and Control Unit 134 moves pixels from the FIFO 128 to Image Memory 136 until the predetermined number of pixels remains in the FIFO 128. The Logic and Control Unit 134 then asserts a new DATA REQUEST for the next line, increments the Line Counter 154 in the Logic and Control Unit 134, and commences to move the remaining pixels in the FIFO 128 to IMAGE MEMORY 136 as described above. This process repeats until the Line Counter 154 in the Logic and Control Unit 134 increments to the number of lines value that was received in the first "packet", thereby indicating completion of the image transfer. The predetermined value representing the allowable number of pixels in the FIFO 128 before a new DATA REQUEST can be issued is variable to allow for the most efficient system operation, and to insure that particular timing parameters between image lines of the host system can be realized. The predetermined value is calculated and stored in the Logic and Control Unit 134 taking into account the incoming pixel rate, the rate at which data can be moved from the FIFO 128 to Image Memory 136, and the maximum time between lines allowed by the host system.

Should a framing character or parity error occur, the Logic and Control Unit 134 clears the contents of the FIFO 128, reinitializes the pointer to the beginning of the data line in Image Memory 136, and asserts a REPEAT REQUEST to the data source to initiate a repeat of the data line by the data source. Should the framing characters and parity be correct, the Logic and Control Unit 134 then determines the number of pixels remaining in the FIFO 128 by subtracting the value in the Pixel Done Counter 144 from the line size value received in the first packet.

If the allowable number of pixels remaining in the FIFO 128 is less than a predetermined value, the Logic and Control Unit 134 then asserts a new DATA REQUEST for the next line, and commences to move the remaining pixels in the FIFO 128 to Image Memory 136 using the Pixel Done Counter 144 in the Logic and Control Unit 134 to determine the number of transfers to be accomplished. If the number of pixels remaining in the FIFO 128 is greater than the predetermined value, then the Logic and Control Unit 134 moves pixels from the FIFO 128 to Image Memory 136 until the predetermined number of pixels remains in the FIFO 128. The Logic and Control Unit 134 then asserts a new DATA REQUEST for the next line, increments the Line Counter 154 in the Logic and Control Unit 134, and commences to move the remaining pixels in the FIFO 128 to IMAGE MEMORY 136 as described above. This process repeats until the Line Counter 154 in the Logic and Control Unit 134 increments to the number of lines value that was received in the first "packet", thereby indicating completion of the image transfer. The predetermined value representing the allowable number of pixels in the FIFO 128 before a new DATA REQUEST can be issued is variable to allow for the most efficient system operation, and to insure that particular timing parameters between image lines of the host system can be realized. The predetermined value is calculated and stored in the Logic and Control Unit 134 taking into account the incoming pixel rate, the rate at which data can be moved from the FIFO 128 to Image Memory 136, and the maximum time between lines allowed by the host system.

Figure 5:
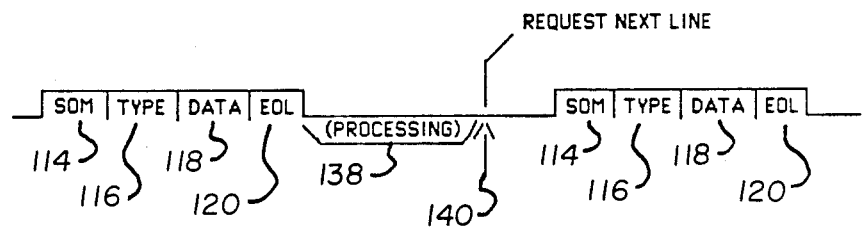
FIG. 5 is a timing diagram showing the timing relationship between the image packets and the control signals used to initiate packet transfers in the UBMED protocol.
Figure 7:
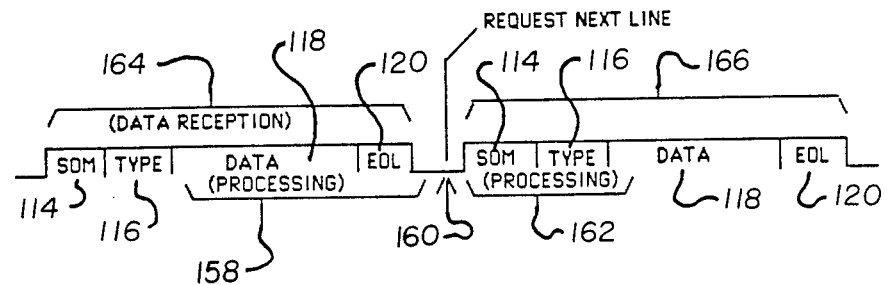
FIG. 7 is a timing diagram useful for showing the timing relationships employed in the receiver of the present invention.

Referring to FIG. 5, the prior art image acquisition cycle consists of a number of image data line transfers where each data line is received and processed one at a time with all processing being completed on the current Input Line 138 before the next data line can be requested 140 from the host system. Referring to FIG. 7, the present invention changes the acquisition cycle to allow the Reception 164 and Local Processing 158 of the input data line to occur simultaneously, while maintaining data integrity throughout the acquisition cycle. Referring to FIG. 6, during the acquisition of a "packet" from the host system, the Logic and Control Unit 134 can transfer portions of the received data line to Image Memory 136 before the end of the "packet" has been received. Referring to FIG. 7, upon reception of the end of Line Character 120 from the host system, the receiver can perform all data evaluation to determine correctness of the received data, and request the next line of data from the Host System 160 before transferring 162 the remaining data of the current line from the FIFO 128 to Image Memory 136.

Figure 8:
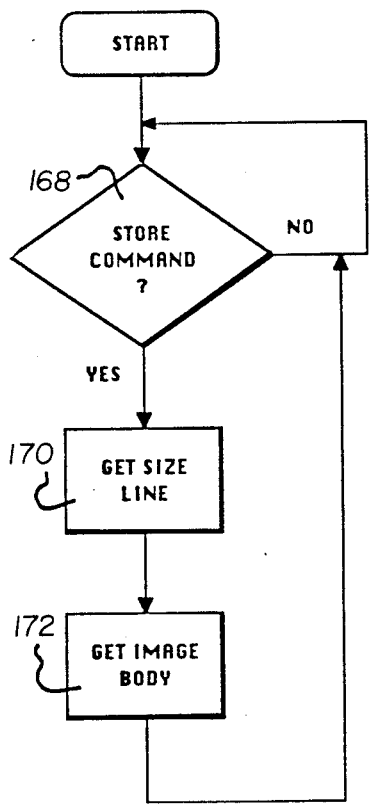
FIG. 8 is a flowchart of the image acquisition cycle.

Referring to FIG. 8, an image acquisition cycle consists of three basic processes. The Store Command 168 process consists of a loop which samples a STORE command indicator set when an image is to be transmitted. If no STORE command is received, the loop continues to sample the STORE indicator indefinitely. Should the process recognize a STORE command, the software proceeds to execute the Get Size Line 170 and Get Image Body 172 processes, and returns to the Store Command 168 inquiry loop. This process sequence is repeated each time a STORE command is received.

Figure 9:
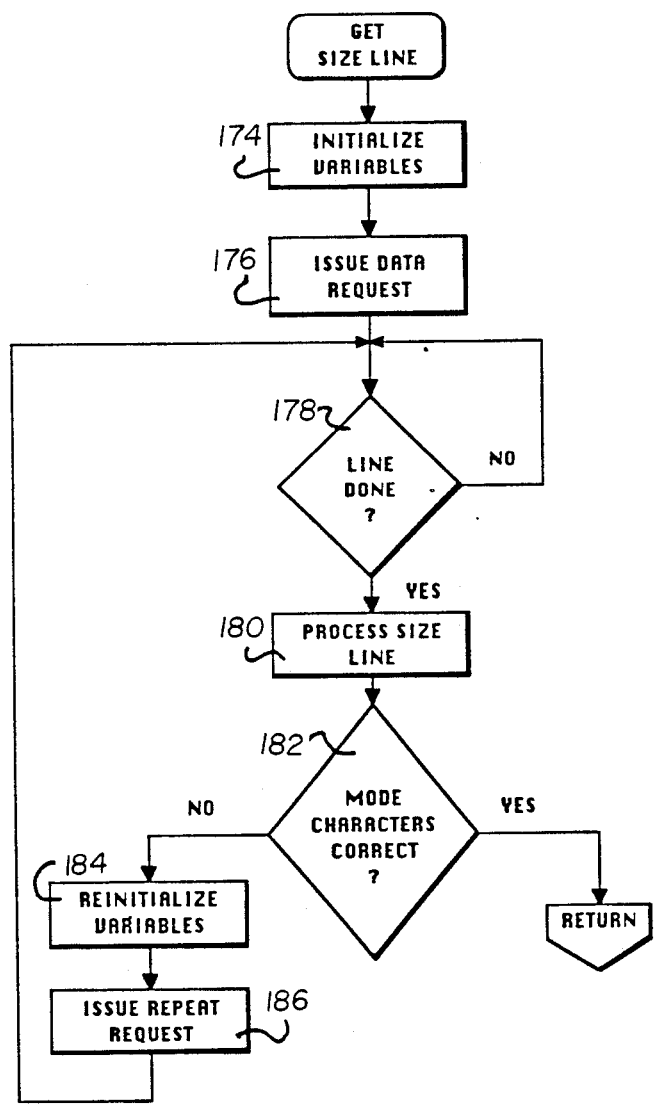
FIG. 9 is a flowchart depicting the logical steps of the size line acquisition process.

Referring to FIG. 9, the Get Size Line Routine 170 first initializes the pertinent variables and Counters 174 used to acquire the size line. This includes clearing any error flags which may be set, and loading the pixel counter (FIG. 6, 146) with the expected line size. Next, the routine issues a DATA REQUEST 176 to initiate a "packet" transfer from the host system. The routine then executes a Loop 178 writing for an EOL indication from the Mode Counter (FIG. 6, 130). Upon reception of the EOL indication, the routine then loads the LINESIZE and IMAGESIZE parameters with the Acquired Data 180 and checks the Mode Characters 182 for expected values. Should a Mode Character be incorrect, the routine then logs the error and reinitializes the Pertinent Variables 184 before issuing a REPEAT REQUEST 186 and returning to the EOL Detection Loop 178. If the Mode Characters are Correct 182, then the routine returns with no further action.

Figure 10:
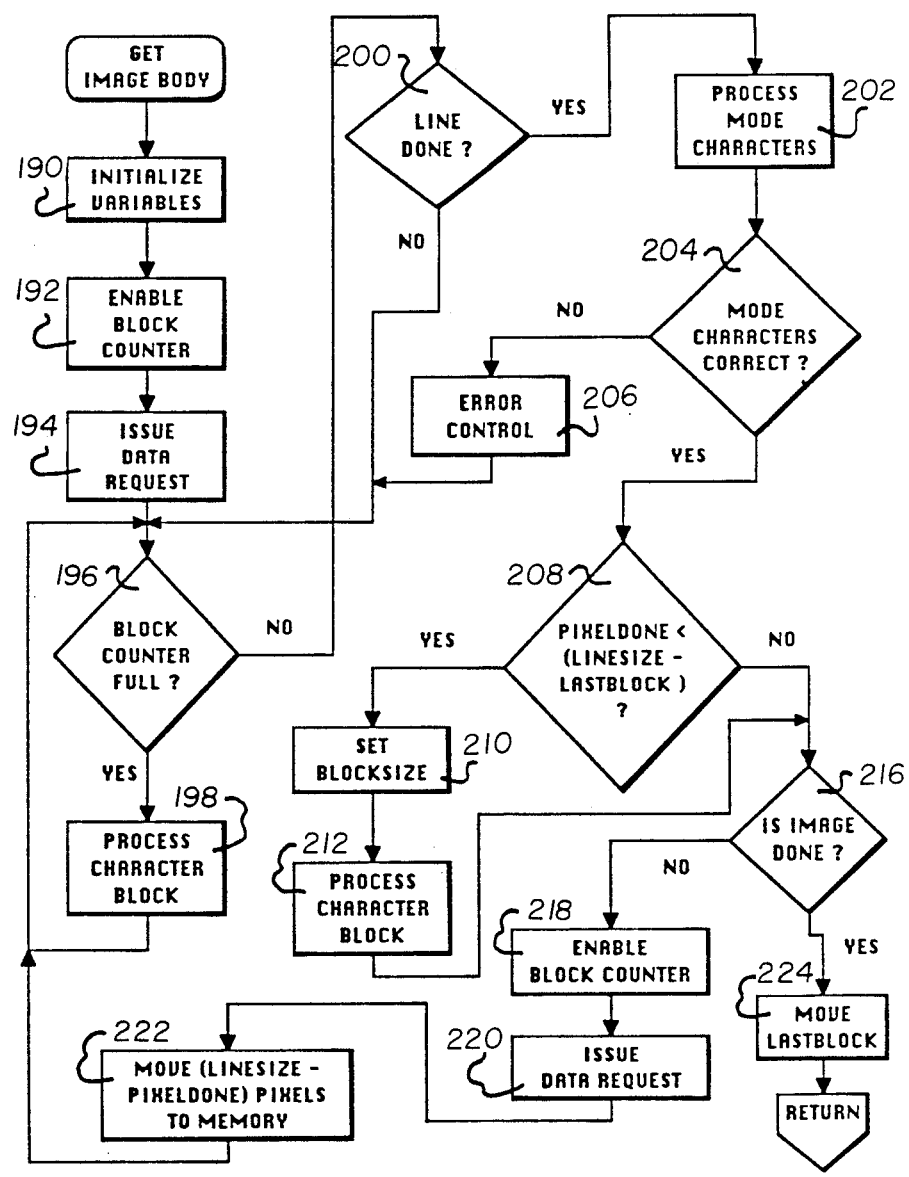
FIG. 10 is a flow chart showing the logical steps of the image body acquisition process.

Referring to FIG. 10, the Get Image Body 172, routine initializes the Variables 190 required to receive an image data "packet". This includes presetting the BLOCKSIZE and LASTBLOCK variables to the predetermined values, and clearing any error conditions which may inhibit the "packet" processing. Next, the software enables the Block Counter 192 to count the incoming pixel clocks, and then issues a DATA REQUEST 194 to initiate the data "packet" transfer from the host system. The software then tests the Block Counter Full 196 indicator to determine if a block of pixels has been received. If the Block Counter Full Indicator is true, the software then executes the Process Character Block Routine 198 and returns to the Block Counter Full 196 test to determine the next process to execute.

Figure 11:
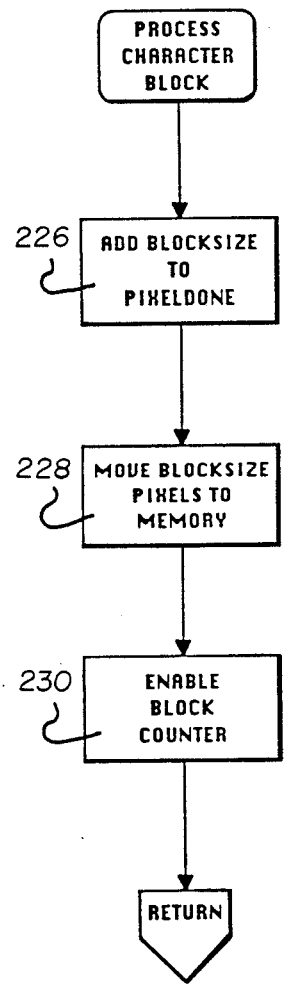
FIG. 11 is a flowchart useful for depicting the block move process of the image line acquisition process.

Referring to FIG. 11, the process Character Block Routine 198 adds 226 the BLOCKSIZE value to the PIXEL DONE value in the Pixel Done Counter (FIG. 6, 144) thereby recording the total number of pixels completed. The Process Character Block Routine then moves BLOCKSIZE Pixels 228 from the FIFO (FIG. 6, 128) to IMAGE MEMORY (FIG. 6, 136). Next, the routine enables the Block Counter 230 to record another pixel block transfer, and then returns to the calling process.

Referring to FIG. 10, if the Block Counter Full 196 test is false, the process proceeds to test the LINE DONE 200 indicator. If the LINE DONE 200 test is false, the process proceeds to the Block Counter Full 196 test. When the LINE DONE Test 200 is true, the process reads the values of the Mode Characters 202 from the Mode Registers (FIG. 6, 150) and then tests the Mode Characters 204 for the expected values and checks for any error indications that may be present. If a Mode Character Test 204 is false, the process calls for ERROR CONTROL 202 routine, then proceeds to the Block Counter Full 196 test upon completion of the ERROR CONTROL 206 routine.

Figure 12:
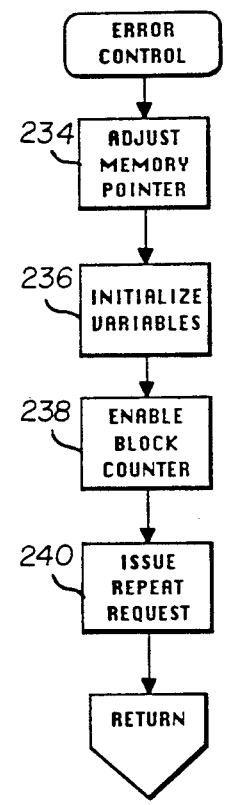
FIG. 12 is a flowchart of the error handling process of the image line acquisition process.

Referring to FIG. 12, the ERROR CONTROL routine adjusts the MEMORY POINTER 234 to the value it contained at the start of the "packet" acquisition, initializes the Pertinent Variables 236, enables the Block Counter 238 to record a block transfer, issues a REPEAT REQUEST 240 to the host system, and returns to the calling process.

Referring to FIG. 10, if the Mode Character 204 test is true, the process checks the current value 208 of PIXEL DONE in the Pixel Done Counter (FIG. 6, 144) to determine if additional pixels must be moved to IMAGE MEMORY (FIG. 6, 136) from the FIFO (FIG. 6, 128) before another DATA REQUEST may be issued. If the number of pixels remaining in the FIFO (FIG. 6, 128) is less than or equal to the LASTBLOCK value, the process goes directly to the IMAGE DONE Check 216, otherwise, the process sets the BLOCK SIZE 210 to reflect the number of pixels to be moved, and then calls the Process Character Block 212 routine to move BLOCKSIZE pixels from the FIFO (FIG. 6, 128) to IMAGE MEMORY (FIG. 6, 136) and update the PIXEL DONE value before proceeding to the IMAGE DONE Check 216.

The process performs an IMAGE DONE test 216 by comparing LINECOUNT TO IMAGESIZE to determine if the entire image has been received. IF the IMAGE DONE test is false, the process adds one to the LINECOUNT in the Line Counter (FIG. 6, 154), zeros the PIXEL DONE count, enables the Block Counter 218, issues a new DATA REQUEST 220, moves LASTBLOCK pixels from the FIFO (FIG. 6, 128) to IMAGE MEMORY 222 (FIG. 6, 136), and proceeds to the Block Counter Full Test 196 for the next image "packet". If the IMAGE DONE Test 216 is true, the routine calculates the number of pixels remaining in the FIFO (FIG. 6, 128), moves the remaining Pixels 224 from the FIFO (FIG. 6, 128) to IMAGE MEMORY (FIG. 6, 136) and returns to the calling routine.

INDUSTRIAL APPLICABILITY AND ADVANTAGES

The present invention is useful in apparatus for transmitting and receiving images according to the UBMED protocol. It has the advantage that images may be transmitted more efficiently over a channel in a shorter period of time.

I claim:

1. An improved digital data transmission system for transmitting and receiving digital images, of the type having a means for transmitting a line of characters including a start of message character, a line type character, a plurality of data :characters, and an end of line character; buffer means for receiving the line of characters and delivering the characters to an image memory; an image memory for receiving lines of characters from the buffer means; logic and control means including means for evaluating the parity of each character and generating a reorder line signal if parity is violated, means for counting characters to determine the current number of characters in a line received that have been transferred to the image memory and generating a reorder signal if the count is incorrect, a mode counter for signaling the receipt of an end of line character, and mode evaluator means for (1) checking the correctness of the start of message character, (2) checking to see if the line is an image size packet, and if so, determining the size of the image, and (3) responsive to the signal from the block counter to begin transferring the message from the buffer means to the image memory, and (4) responsive to the end of line character from the mode counter means to order the next line if the end of line character is an end of line message and to verify that a full image is received if the end of line character represents an end of image, wherein the improvement comprises:

a. block counter means for counting characters in an incoming message simultaneously with loading the characters into the buffer means and producing an end of block indication when a predetermined number of characters have been received,
   b. pixel counter means for counting data characters per line and producing a signal representing the character count,
   c. mode register means for storing the end of line character external to the buffer means; and
   d. said logic and control means being responsive to the end of block indication from the block counter means to begin transferring data from the buffer means to the image memory, and responsive to the signal from the mode counter that an end of line character has been received for retrieving the end of line character from the mode register, and if the end of line character represents an end of line, retrieving the character count from the pixel counter means, and if the number of characters left in the buffer means is less than a predetermined number, requesting another line of data;
   whereby, data received is processed into the image memory during the receipt of further data, and the next line of data is requested during the processing of the previous line.

2. The digital data transmission system claimed in claim 1, wherein said block counter means includes, manually adjustable hardware means for setting said predetermined number of characters.

3. The digital data transmission system claimed in claim 1, wherein said logic and control means include means for calculating said predetermined number employed by said block counter means based on line size, input data rate, and the rate of transfer of data from the buffer to the image memory.

4. The digital data transmission system claimed in claim 1, wherein said mode register means also contains the start of message character and the line type character.

* * * * *